(12) United States Patent
Wu

(10) Patent No.: US 7,304,584 B2
(45) Date of Patent: Dec. 4, 2007

(54) WIRELESS INPUT DEVICE WITH LOW VOLTAGE MANDATORY ALERT FUNCTION

(75) Inventor: Yu-Hsi Wu, Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 458 days.

(21) Appl. No.: 11/102,230

(22) Filed: Apr. 11, 2005

(65) Prior Publication Data
US 2006/0226999 A1    Oct. 12, 2006

(30) Foreign Application Priority Data
Jul. 19, 2004    (TW) ............... 93211388 U

(51) Int. Cl.
*G08B 21/00* (2006.01)
(52) U.S. Cl. ............. 340/663; 324/433; 345/161; 345/163
(58) Field of Classification Search ............. 340/663, 340/693.3, 10.34; 324/433; 341/22; 345/161, 345/163; 455/574
See application file for complete search history.

(56) References Cited

U.S. PATENT DOCUMENTS

| 5,789,098 | A | * | 8/1998 | Pinder ................ 340/663 |
| 5,854,621 | A | * | 12/1998 | Junod et al. ........... 345/163 |
| 5,925,110 | A | * | 7/1999 | Klein ................... 341/22 |
| 6,295,002 | B1 | * | 9/2001 | Fukuda ............... 340/636.1 |
| 6,437,575 | B1 | * | 8/2002 | Lin et al. ............. 324/433 |
| 6,510,524 | B1 | * | 1/2003 | Osborn et al. ......... 713/323 |
| 6,611,921 | B2 | * | 8/2003 | Casebolt et al. ....... 713/324 |
| 6,760,851 | B2 | * | 7/2004 | Teshima et al. ........ 345/163 |
| 6,801,967 | B2 | * | 10/2004 | Nakamura et al. ...... 345/163 |
| 6,985,755 | B2 | * | 1/2006 | Cadieux et al. ........ 345/156 |
| 7,123,033 | B1 | * | 10/2006 | Wright ................ 324/713 |

* cited by examiner

*Primary Examiner*—John Tweel, Jr.
(74) *Attorney, Agent, or Firm*—Rosenberg, Klein & Lee

(57) ABSTRACT

The present invention relates to a wireless input device with a low voltage mandatory alert function, including: a battery for supplying power for the wireless input device; a microcontroller for handling the input signals of the wireless input device. The present invention is characterized in that the microcontroller is used for detecting the voltage of the battery; when the voltage is lowered to the lower limit voltage, the wireless input device can no longer operate.

13 Claims, 2 Drawing Sheets

Detecting the voltage of the battery; causing the wireless input device to send a low voltage warning message when the voltage reduces to the weak voltage level.

Detecting the voltage of the battery; disabling the wireless input device when the voltage reduces to the lower limit voltage.

FIG. 2

WIRELESS INPUT DEVICE WITH LOW VOLTAGE MANDATORY ALERT FUNCTION

FIELD OF THE INVENTION

The present invention relates to a wireless input device, such as a wireless keyboard or a wireless mouse; in particular, it relates to a wireless input device with a low voltage mandatory alert function.

BACKGROUND OF THE INVENTION

The conventional wireless input device, such as a wireless keyboard or a wireless mouse, etc., is provided with a low voltage warning mechanism to notify a user that the battery is in a weak voltage state before the battery runs out. After the notification is executed, the conventional wireless input device is still operable until the battery is completely dead. The method of handling battery power by the conventional wireless input device usually causes the battery to continue supplying power in a weak voltage condition. Meanwhile, if the user is not using the wireless input device in this period of time so that the weak voltage condition cannot be properly detected at such a dangerous stage, over consumption of the battery can cause electrolyte leakage. The circuits within the wireless input device can further be eroded, causing the malfunction of the wireless input device.

As the battery continues to provide the wireless input device with power in such a weak voltage condition, unexpected problems can occur. For example, because the weak voltage battery can not provide the RF emitting module with enough emitting power as required by the power condition, the RF emitting signal can be weakened and thus generate error and cause some noise problem.

Based on the disadvantages of the conventional wireless input device, the inventor of the present invention improves the wireless input device to include a low voltage mandatory alert function, requesting the user to replace with a new battery immediately.

SUMMARY OF THE INVENTION

One feature of the present invention is to provide a wireless input device with a low voltage mandatory alert function and requesting the user to replace a new battery immediately before the user further operates such device.

Another aspect of the present invention is to provide a wireless input device with a means to prevent damage to the wireless input device due to electrolyte leakage of the weak voltage battery.

In order to accomplish the above-mentioned features, the present invention provides a wireless input device with a low voltage mandatory alert function, including: a battery for supplying power for the wireless input device; a microcontroller for handling the input signals of the wireless input device. The present invention is characterized in that the microcontroller is used for detecting the voltage of the battery; when the voltage is lowered to the lower limit voltage, the wireless input device can no longer operate.

BRIEF DESCRIPTION OF THE DRAWINGS

The above objects and advantages of the present invention will become more apparent with reference to the appended drawings wherein:

FIG. 2 shows a flow chart of the procedures executed by the microcontroller in accordance with the present invention.

DETAILED DESCRIPTION OF THE INVENTION

Figure 1:
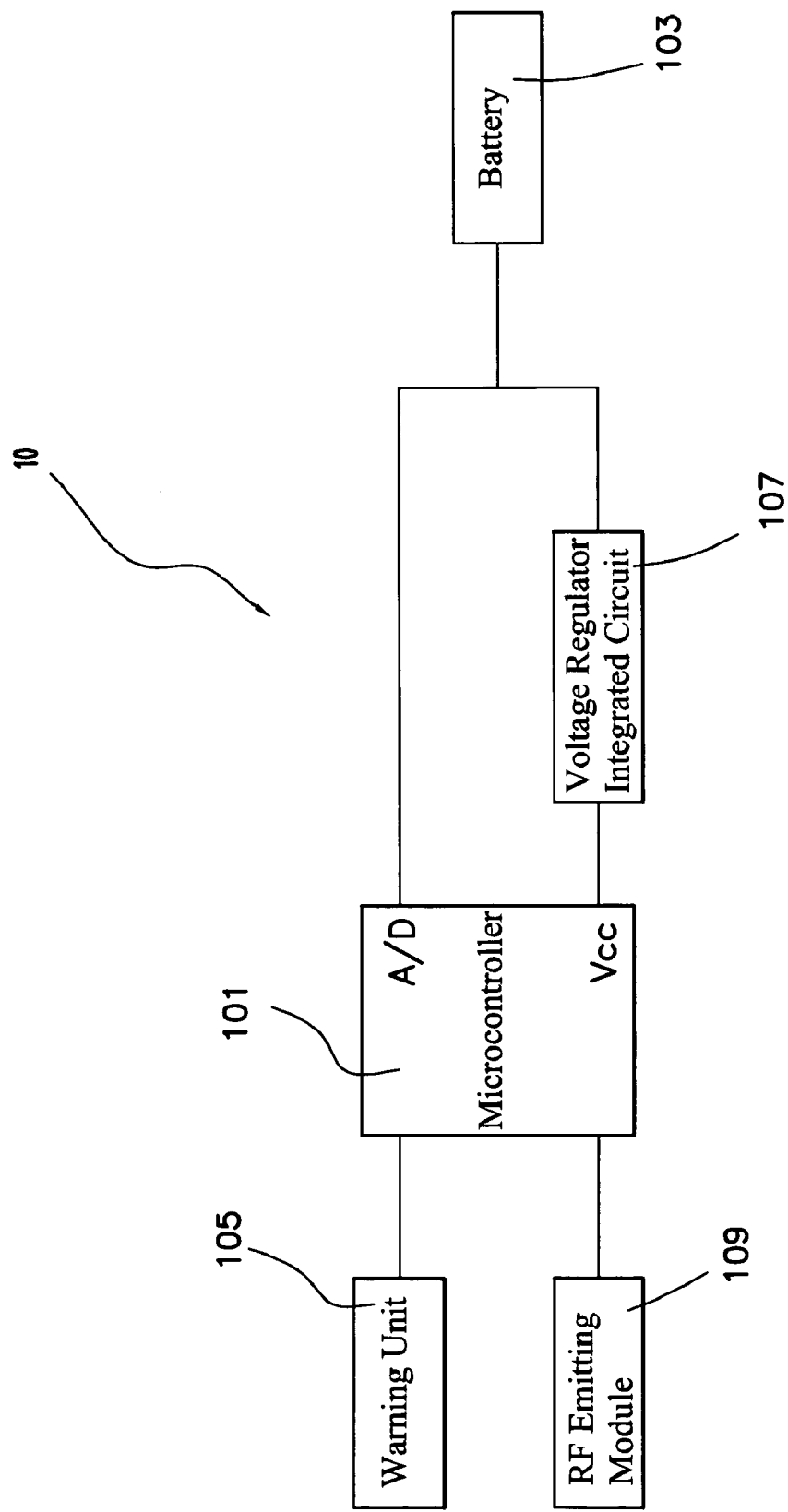
FIG. 1 shows a structural view of the wireless input device in accordance with the present invention.

The wireless input device 10 with a low voltage mandatory alert function in accordance with the present invention is mainly to force the user to immediately replace with a new battery before the old battery runs out. In this manner, the battery can prevent electrolyte leakage when it has not been used for a certain period of time but is still providing power in such a low battery condition. The leaked electrolyte can erode within the wireless input device, causing damage to the circuits and malfunction of the wireless input device.

FIG. 1 shows a structural view of the wireless input device in accordance with the present invention, while FIG. 2 shows a flow chart of the procedures executed by the microcontroller in accordance with the present invention. In FIG. 1, an embodiment of the wireless input device 10 can be a wireless keyboard, a wireless mouse, or even a wireless joystick. In order to easily disclose the present invention and to allow those technically qualified to understand the present invention, FIG. 1 does not show any other related circuits composing the wireless input device 10, such as the key matrix circuit of the wireless keyboard, or the X-Y shift generating circuit of the wireless mouse. Wireless input device 10 includes a microcontroller 101, and at least one battery 103; wherein the battery 103 is for supplying power for the wireless input device 10, while the microcontroller 101 is for handling input signals from the wireless input device 10, such as, for handling the key input signals from the key matrix circuit, or handling the cursor input signals from the X-Y shift generating circuit. The characteristics of the wireless input device 10 in accordance with the present invention is that when the wireless input device 10 is operable, the microcontroller 101 can detect the voltage of the battery 103 at any time; when the voltage of the battery 103 is reduced to a weak voltage level, the microcontroller 101 can cause the alarm unit 105 to send a low voltage warning message; for example, an LED 105 can emit flickering light, or the microcontroller 101 can send a low voltage warning message to the corresponding wireless receiver, and then show such voltage warning message on the computer screen via the computer connected to the wireless receiver. The present invention is most characterized in the condition that when the voltage detected by the microcontroller 101 continues to reduce towards the lower limit voltage, the microcontroller 101 detecting this condition can cause the wireless input device 10 to completely lose its functionality. For example, the microcontroller 101 can cause the wireless keyboard not to generate any key input signals, or cause the wireless mouse not to generate any cursor input signals, even though the remaining voltage of the battery 103 at the time can still provide enough power to function properly. The wireless input device 10 can only become operable after the user feels the immediate need to replace the old battery with a new one.

Now, an embodiment is used to describe the association between the battery voltage and the lower limit voltage. The electric specification of the microcontroller 101 adopted by the present invention is, for example, a supply voltage (VCC) of 3.2V, the lowest working voltage of 2.0V, with a hibernate mode, or with an internal analog/digital signal converter, etc. In FIG. 1, the battery 103 can be 3 volts, as well as can be serially connected with two 1.5V new batteries, and then be converted to 3.2V by a voltage regulator integrated circuit 107 as the working voltage of the microcontroller 101. Meanwhile, the positive end of the battery 103 can also be connected to the input node of the analog/digital signal converter of the microcontroller 101 so as to allow the microcontroller 101 to detect the voltage of the battery 103. In this manner, the microcontroller 101 can control the occurrence of the voltage reducing to the lower limit voltage. When the voltage detected by the microcontroller 101 is within the range of 2.2V and 2.1V, the voltage range of 2.2V and 2.1V being the weak voltage level in the embodiment, the battery voltage at this time is still larger than the lower limit voltage and can allow the wireless input device 10 to operate for a longer period of time. At this stage, the microcontroller 101 will cause the warning unit 105 to send a low voltage warning message so as to emphasize that although the wireless input device 10 is in a low voltage condition, the battery 103 at the current stage still has enough power to allow the wireless input device 10 to operate. When the voltage detected by the microcontroller 101 is then reduced to the lower limit voltage of 2.1V, the voltage at this time is approximately close to the lowest working voltage of the microcontroller 101. The microcontroller 101 at this time will immediately cause the wireless input device 10 to completely lose its functionality. For example, the microcontroller 101 causes the RF emitting module 109 to switch off its functionality, such that it can no longer emit any signal; or, the microcontroller 101 can automatically go into the hibernate mode, such that it can no longer handle any key input signal or cursor input signal. In this manner, the user will feel the immediate need to replace the battery with a new one so as to keep the wireless input device 10 operable.

The determination of the lower limit voltage from the lowest working voltage of the microcontroller 101 disclosed above is merely for illustrative purpose. The way to determine the lower limit voltage in accordance with the present invention is not limited to the illustration above. Those technically qualified can determine the lowest working voltage operable for the wireless input device 10 based on the overall circuit of the wireless input device 10 and set the lower limit voltage of the wireless input device 10 accordingly.

Furthermore, the microcontroller 101 can be used to output the remaining power of the battery 103, by means of sending a message indicating the remaining battery power to the wireless receiver corresponding to the wireless input device 10, and then showing the remaining power on the computer screen via the computer connected to the wireless receiver.

Although the preferred embodiment in accordance with the present invention has been descried above, it is not intended to limit the present invention. Those technically qualified can modify and change the embodiment without leaving the spirit and scope of the present invention. The modifications and changes are still protected in the protection scope set forth in the claims below.

What is claimed is:

1. A wireless input device with a low voltage mandatory alert function, said device comprising: at least one battery for supplying power for said wireless input device; a microcontroller for handling input signals from said wireless input device, and characterized in that said microcontroller is used for detecting the voltage of said battery, and when said voltage is lowered to a lower limit voltage, said wireless input device is unable to operate.

2. The wireless input device according to claim 1, wherein said microcontroller further requests said wireless input device to send a low voltage warning message.

3. The wireless input device according to claim 2, further including a warning unit electronically coupled to said microcontroller.

4. The wireless input device according to claim 3, wherein said warning unit is an LED, and wherein said low voltage warning message is a flickering light.

5. The wireless input device according to claim 1, wherein said microcontroller further outputs a message for remaining voltage.

6. The wireless input device according to claim 1, wherein said microcontroller includes an analog/digital signal converter, wherein said analog/digital signal converter is for detecting said voltage of said battery.

7. The wireless input device according to claim 1, wherein said microcontroller is a microcontroller with a hibernate mode, wherein when said microcontroller detects that said voltage of said battery is lowered to said lower limit voltage, said microcontroller is switched to said hibernate mode so as to prevent said wireless input device from operating.

8. The wireless input device according to claim 1, wherein when said microcontroller detects that said voltage of said battery is lowered to said lower limit voltage, said microcontroller requests an RF emitting module to switch off the function thereof, so as to prevent said wireless input device from operating.

9. The wireless input device according to claim 1, wherein said lower limit voltage is close to and slightly larger than the lowest working voltage of said microcontroller.

10. The wireless input device according to claim 1, wherein said lower limit voltage is close to and slightly larger than the lowest working voltage of the overall circuit of said wireless input device.

11. The wireless input device according to claim 1, wherein said wireless input device is a wireless keyboard.

12. The wireless input device according to claim 1, wherein said wireless input device is a wireless mouse.

13. The wireless input device according to claim 1, wherein said wireless input device is a wireless joystick.

* * * * *